United States Patent
Nakata

(10) Patent No.: US 8,611,438 B2
(45) Date of Patent: Dec. 17, 2013

(54) BROADCAST RECEIVER

(75) Inventor: Kazuhiro Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 13/062,251

(22) PCT Filed: Sep. 28, 2009

(86) PCT No.: PCT/JP2009/004916
§ 371 (c)(1),
(2), (4) Date: Mar. 4, 2011

(87) PCT Pub. No.: WO2010/058511
PCT Pub. Date: May 27, 2010

(65) Prior Publication Data
US 2011/0158296 A1   Jun. 30, 2011

(30) Foreign Application Priority Data
Nov. 20, 2008 (JP) .................... 2008-296950

(51) Int. Cl.
*H04L 27/00* (2006.01)
(52) U.S. Cl.
USPC .................. 375/259; 455/60; 381/2
(58) Field of Classification Search
USPC ............. 375/216, 259, 322, 340; 455/60, 455/130–132
See application file for complete search history.

(56) References Cited

U.S. PATENT DOCUMENTS

| | | | |
|---|---|---|---|
| 7,546,088 B2 * | 6/2009 | Kroeger et al. | 455/60 |
| 2005/0020220 A1 | 1/2005 | Gamou | |
| 2005/0232431 A1 * | 10/2005 | Kato | 381/2 |
| 2006/0083380 A1 | 4/2006 | Mino et al. | |
| 2008/0232480 A1 * | 9/2008 | Tuttle et al. | 375/259 |

FOREIGN PATENT DOCUMENTS

| | | |
|---|---|---|
| EP | 1227608 A2 | 7/2002 |
| JP | 2-188011 A | 7/1990 |
| JP | 6-178231 A | 6/1994 |
| JP | 2004-289781 A | 10/2004 |
| WO | WO 2007/025813 A1 | 3/2007 |

* cited by examiner

*Primary Examiner* — Leon-Viet Nguyen
(74) *Attorney, Agent, or Firm* — Birch, Stewart, Kolasch & Birch, LLP

(57) ABSTRACT

When switching from a digital broadcast to a analog broadcast, a broadcast receiver switches to the analog broadcast after adjusting the reproduced frequency band and the degree of left-right separation of the digital broadcast to be equal to the values of the analog broadcast specified from the receiving state of the analog broadcast respectively, and, when switching from the analog broadcast to the digital broadcast, after adjusting the reproduced frequency band and the degree of left-right separation of the digital broadcast to be equal to the specified values of the analog broadcast respectively and then switching to the digital broadcast, adjusts the reproduced frequency band and the degree of left-right separation of the digital broadcast to be equal to values set for the digital broadcast respectively.

2 Claims, 7 Drawing Sheets

(a)

(b)

(a)

(b)

(c)

(a)

(b)

(c)

BROADCAST RECEIVER

FIELD OF THE INVENTION

The present invention relates to a broadcast receiver that receives an analog broadcast and a digital broadcast which have the same broadcast contents and which are being broadcasted concurrently from a broadcast medium.

BACKGROUND OF THE INVENTION

Patent reference 1 discloses an audio broadcast receiver which when the reception quality level of a digital radio becomes equal to or higher than or lower than a reference level, makes the frequency characteristic of a digital sound match with that of an analog sound and then switches from the analog sound to the digital sound or from the digital sound to the analog sound.

RELATED ART DOCUMENT

Patent Reference

Patent reference 1: JP, 2004-289781, A

SUMMARY OF THE INVENTION

However, the receiving characteristics of an analog radio broadcast, such as a frequency characteristic and a channel separation (a degree of left-right separation at the time of stereophonic broadcasting), vary moment by moment according to the receiving state of the analog radio wave in order to usually provide optimal receiving sound quality. In contrast with this, according to the method disclosed by patent reference 1, matching of the receiving characteristics is carried out on the basis of the preset reception quality reference level. A problem is therefore that there is a possibility that switching the output sound from the digital broadcast to the analog broadcast or from the analog broadcast to the digital broadcast cannot be carried out smoothly except in a state in which the analog radio wave is received under fixed conditions optimized using the above-mentioned reference value.

The present invention is made in order to solve the above-mentioned problem, and it is therefore an object of the present invention to provide a broadcast receiver that can carry out switching between an analog broadcast and a digital broadcast smoothly without causing hearing discomfort to a user by adaptively determining the matching range of receiving characteristics, such as a frequency characteristic and a channel separation (the degree of left-right separation), according to the received radio wave state of the analog broadcast.

In accordance with the present invention, there is provided a broadcast receiver including: a switching means for switching a sound to be outputted between a sound extracted from the analog broadcast and a sound extracted from the digital broadcast; a detecting means for detecting a receiving state of the analog broadcast; an analog broadcast sound signal processing means for restricting a frequency characteristic and a degree of left-right separation of left and right channel signals of the sound signal of the analog broadcast; a first adjusting means for adjusting a reproduced frequency band exclusively used for the digital broadcast; a second adjusting means for adjusting a degree of left-right separation exclusively used for the digital broadcast; and a control means for specifying a restricted setting of the reproduced frequency band and a restricted setting of the degree of left-right separation of the sound signal extracted from the analog broadcast, the restricted settings being set by the analog broadcast sound signal processing means, from the receiving state detected by the detecting means, and for controlling the switching means, the first adjusting means, and the second adjusting means to, when switching from the digital broadcast to the analog broadcast, switch to the sound signal extracted from the analog broadcast after restricting characteristics of the first and second adjusting means in such a way that the reproduced frequency band and the degree of left-right separation of the sound signal extracted from the digital broadcast vary from the unrestricted settings exclusively used for the digital broadcast and become equal to the specified settings at a time of reception of the analog broadcast respectively, and, when switching from the analog broadcast to the digital broadcast, after restricting the first and second adjusting means in such a way that the reproduced frequency band and the degree of left-right separation of the digital broadcast become equal to the specified settings at the time of reception of the analog broadcast respectively and then switching from the sound signal extracted from the analog broadcast to the sound signal extracted from the digital broadcast, increase the reproduced frequency band and the degree of left-right separation of the digital broadcast up to the unrestricted settings exclusively used for the digital broadcast respectively.

When switching from the digital broadcast to the analog broadcast, the broadcast receiver in accordance with the present invention switches to the sound signal extracted from the analog broadcast after restricting characteristics of the first and second adjusting means in such a way that the reproduced frequency band and the degree of left-right separation of the sound signal extracted from the digital broadcast vary from the unrestricted settings exclusively used for the digital broadcast and become equal to specified settings at a time of reception of the analog broadcast respectively, and, when switching from the analog broadcast to the digital broadcast, after restricting the first and second adjusting means in such a way that the reproduced frequency band and the degree of left-right separation of the digital broadcast become equal to specified settings at the time of reception of the analog broadcast respectively and then switching from the sound signal extracted from the analog broadcast to the sound signal extracted from the digital broadcast, increase the reproduced frequency band and the degree of left-right separation of the digital broadcast up to the unrestricted settings exclusively used for the digital broadcast respectively. Thus, by adjusting the acoustic characteristics of the digital broadcast according to the receiving state of the analog broadcast, the broadcast receiver can carry out switching between the analog broadcast and the digital broadcast smoothly without causing hearing discomfort to a user.

EMBODIMENTS OF THE INVENTION

Hereafter, in order to explain this invention in greater detail, the preferred embodiments of the present invention will be described with reference to the accompanying drawings. Embodiment 1.

Figure 1:
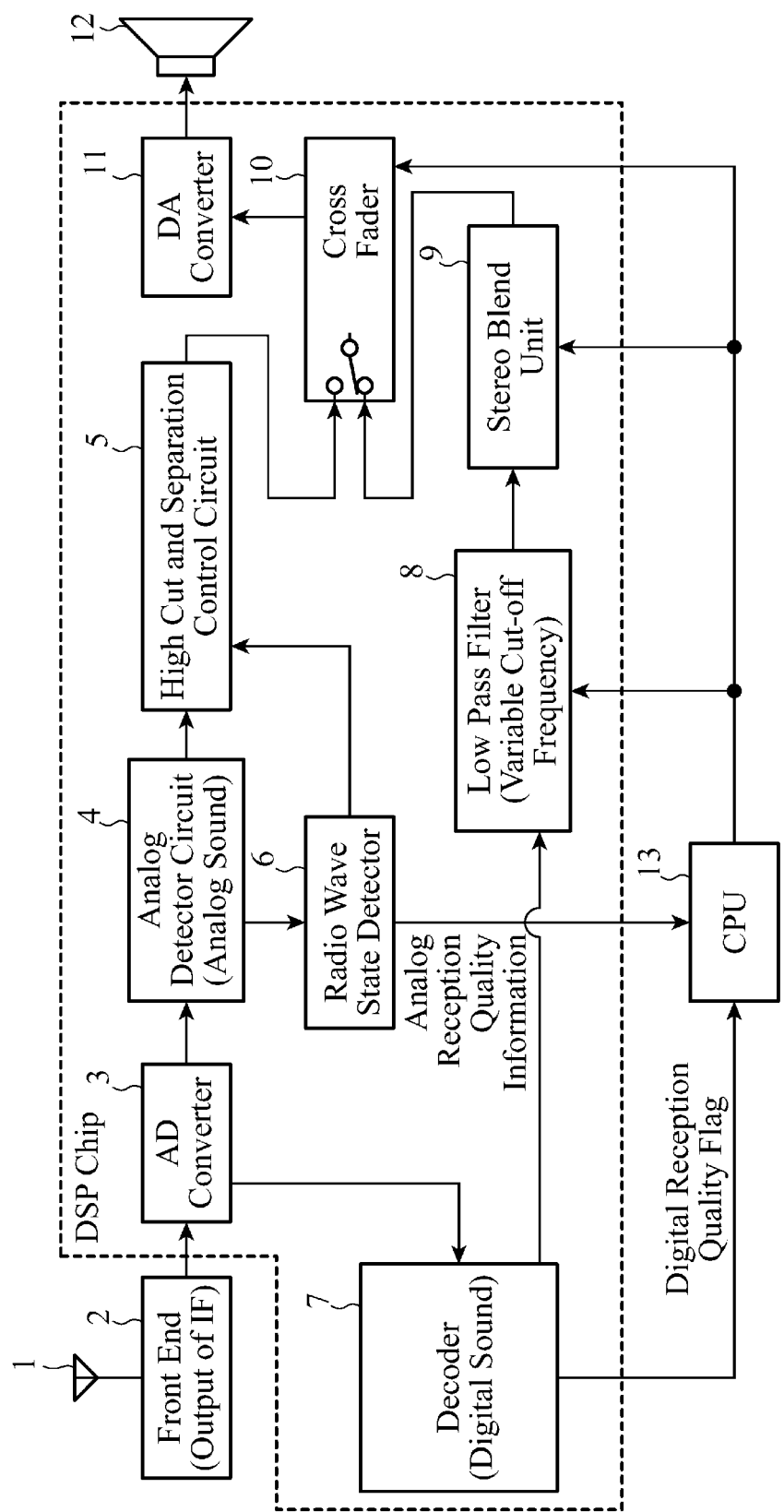
FIG. 1 is a block diagram showing the structure of a broadcast receiver in accordance with Embodiment 1 of the present invention.

FIG. 1 is a block diagram showing the structure of a broadcast receiver in accordance with Embodiment 1 of the present invention, and shows a radio receiver to which the present invention is applied. In FIG. 1, the radio receiver in accordance with Embodiment 1 is provided with a radio antenna 1, a front end 2, an AD converter 3, an analog detector circuit 4, a high-cut and separation control circuit 5, a radio wave state detector 6, a decoder 7, a low pass filter 8, a stereo blend unit 9, a cross fader (a switching means) 10, a DA converter 11, a speaker 12, and a CPU 13.

The front end 2 converts an RF (Radio Frequency) signal received by the radio antenna 1 into an IF (Intermediate Frequency) signal, and outputs this IF signal. The AD converter 3 samples the IF signal from the front end 2 to convert the IF signal into a digital signal. The analog detector circuit 4 is a component for converting the digital signal from the AD converter 3 into an analog sound signal, and informs a received field strength, a multipath strength, an adjacent station strength, etc. in reception of an analog broadcast to the radio wave state detector 6.

When the radio wave state gets worse, the high-cut and separation control circuit 5 cuts high-frequency components in the sound reproduction band of the analog broadcast and reduces the channel separation (the degree of left-right separation) between a left channel signal and a right channel signal (the degree of left-right separation). The radio wave state detector (a detecting means) 6 detects the received field strength, the multipath strength, the adjacent station strength, etc. informed thereto from the analog detector circuit 4 so as to create analog reception quality information showing the evaluated quality of the analog radio reception.

The decoder (a flag setting means) 7 reproduces a sound signal from I/Q data while measuring a CN value required for digital radio reception, etc., and creates a digital reception quality flag showing the quality of digital reception by showing whether the digital reception quality flag is active or inactive. A delay process and so on are also carried out by the decoder 7. A low pass filter (a first adjusting means) 8 (abbreviated as an LPF 8 from here on) has a variable cut-off frequency. The stereo blend unit (a second adjusting means) 9 can freely change the channel separation (the degree of left-right separation) of a digital broadcast.

The cross fader 10 fades out one of the outputs of the high-cut and separation control circuit 5 and the stereo blend unit 9 gradually while fading in the other one of them gradually to operate in such a way that the sum total of both the outputs always becomes constant. The DA converter 11 is a component for converting the output of the cross fader 10 into an analog signal, and outputs the acquired analog signal, as a sound, via the speaker 12. The CPU (a control means) 13 refers to the analog reception quality information and the state of the digital reception quality flag, and controls the LPF 8, the stereo blend unit 9, and the cross fader 10 according to the analog reception quality information and the state of the digital reception quality flag.

A portion shown by a dashed line shown in FIG. 1 denotes a DSP (Digital Signal Processor) chip, and the AD converter 3, the analog detector circuit 4, the high-cut and separation control circuit 5, the radio wave state detector 6, the decoder 7, the LPF 8, the stereo blend unit 9, the cross fader 10, and the DA converter 11 are constructed in the identical DSP chip.

Figure 2:
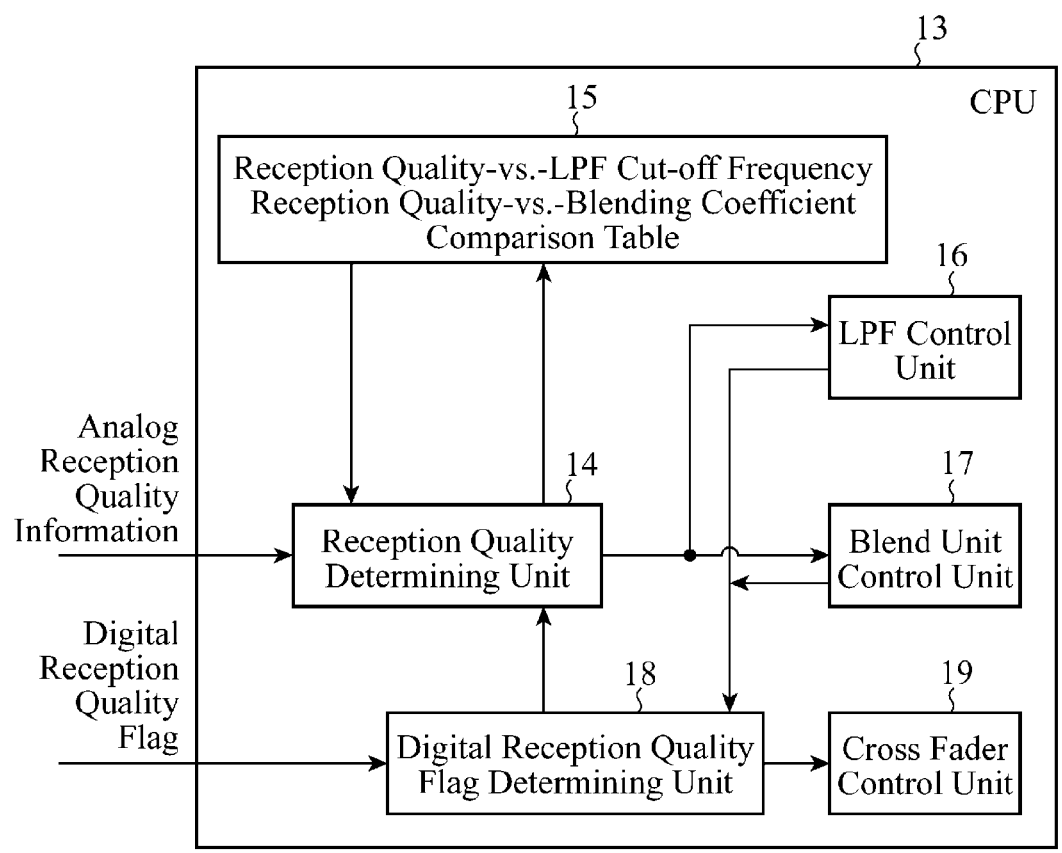
FIG. 2 is a block diagram showing the functional blocks of a CPU shown in FIG. 1.

FIG. 2 is a block diagram showing the functional blocks of the CPU shown in FIG. 1. The CPU 13 is provided with a reception quality determining unit 14, a comparison table 15, an LPF control unit 16, a blend unit control unit 17, a digital reception quality flag determining unit 18, and a cross fader control unit 19, as shown in FIG. 2. These components are embodied as a concrete means in which software and hardware work in cooperation with each other by making the CPU 13 execute a program for control according to the purpose of the present invention.

The reception quality determining unit 14 is a component for receiving the analog reception quality information to control the LPF control unit 16 and the blend unit control unit 17. The comparison table 15 is table data in which comparison data about a comparison between the reception quality which serves as a reference of the reception quality determination and the LPF cut-off frequency, and comparison data about a comparison between the reception quality and a blending coefficient are registered, and is constructed in a storage area of a not-shown memory.

The LPF control unit 16 is a component for controlling the LPF 8, and freely adjusts the cut-off frequency of the LPF 8. The blend unit control unit 17 controls the stereo blend unit 9, and adjusts the channel separation (the degree of left-right separation) of the stereo blend unit 9. The digital reception quality flag determining unit 18 receives the digital reception quality flag, and the control state of the LPF control unit 16 and the control state of the blend unit control unit 17 to control the cross fader control unit 19. The cross fader control unit 19 controls switching between a digital broadcast and an analog broadcast by the cross fader 10.

Next, the operation of the broadcast receiver will be explained.

(1) The Control of Reception an Analog Broadcast, and the Normal Control of Reception of a Digital Broadcast In the case of normal reception of an analog broadcast, the RF signal received by the antenna 1 is converted into an IF signal by the front end 2. After the IF signal is converted into a digital signal by the AD converter 3, an I/Q signal is separated from the digital signal. The analog detector circuit 4 detects the I/Q signal to generate a sound signal, and simultaneously creates analog reception quality information. The analog reception quality information is information showing the field strength, the multipath strength, the adjacent station strength, etc. in the analog broadcast reception.

Within the DSP chip, the high-cut and separation control circuit 5 optimizes a high cut and a channel separation (the degree of left-right separation) to be performed on the sound signal created by the analog detector circuit 4 according to the analog reception quality information to suppress the noise at the time of the reception.

In contrast, in the case of reception of a digital broadcast, the I/Q signal is outputted directly to the decoder 7 for exclusive use. The decoder 7 converts the I/Q signal into a sound signal, and simultaneously creates a digital reception quality flag. The sound signal acquired by the decoder 7 passes through the LPF 8 and the stereo blend unit 9. In a case in which the sound signal is a normal digital sound, the LPF 8 and the stereo blend unit 9 performs nothing on the above-mentioned sound signal (does not process this sound signal) in order to maintain the quality level of the digital sound.

When the reception quality of the digital broadcast is improved (degraded) with an improvement (degradation) or the like in CN, the cross fader 10 is triggered mainly by the digital reception quality flag to switch the sound to be outputted from the analog broadcast to the digital broadcast (or from the digital broadcast to the analog broadcast).

(2) Switching Between the Analog Broadcast and the Digital Broadcast

A case in which the reception quality of the digital broadcast is improved (degraded) and the digital reception quality flag becomes active (inactive), and the broadcast receiver switches from the reception of the analog broadcast to the reception of the digital broadcast (from the digital reception to the analog reception) will be mentioned below. Hereinafter, a case in which the reproduced frequency band width of the digital broadcast is wider than that of the analog broadcast and the degree of left-right separation of the digital broadcast is greater than that of the analog broadcast at the time of stereophonic broadcasting will be mentioned as an example.

(2-1) Switching from the Analog Broadcast to the Digital Broadcast

Figure 3:
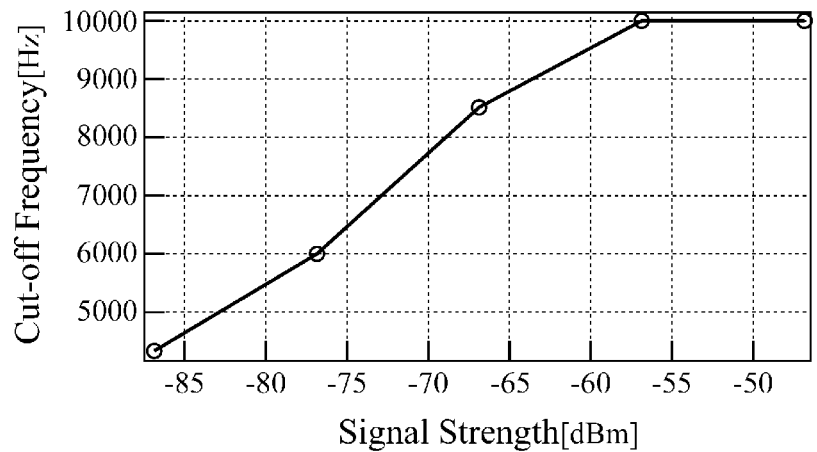
FIG. 3 is a graph showing the receiving characteristic of an analog broadcast.
Figure 3:
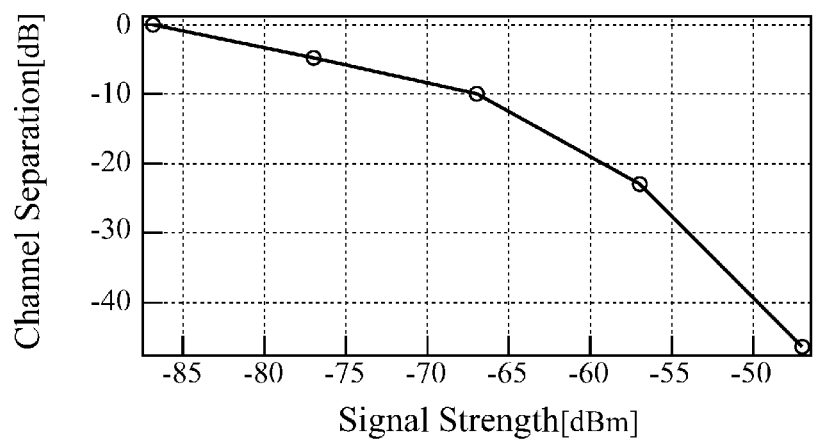

FIG. 3 is a graph showing the receiving characteristics of the analog broadcast, FIG. 3(*a*) shows the dependence of the high-cut cut-off frequency on the signal strength, and FIG. 3(*b*) shows the dependence of the channel separation (the degree of left-right separation) on the signal strength. For example, in the case of a HD (High Definition) radio in North America, a digital broadcast in FM broadcasting of digital analog hybrid type has lower power at the transmit side (transmission power) than that of an analog broadcast by 20 dB.

When the analog broadcast in the hybrid broadcasting has a signal strength of about −88 dBm (the digital broadcast has a signal strength of about −108 dBm), the digital broadcast reception becomes possible. In the analog broadcast reception in this region, the cut-off frequency of the high cut is lowered in order to suppress the noise feeling, and the separation is also set to 0 dB (monophonic broadcasting) in many cases, as shown in FIGS. 3(*a*) and 3(*b*).

In contrast, when the signal strength is close to −50 dBm, the analog broadcast has an original frequency characteristic and an original channel separation (the degree of left-right separation) (about 45 dB) (refer to FIGS. 3(*a*) and 3(*b*)). Because an HD radio digital broadcast can have a frequency characteristic of 20 Hz to 20 kHz and a channel separation (the degree of left-right separation) of more than 70 dB, when switching from an HD radio analog broadcast to an HD radio digital broadcast is made during a short transition time period, the degree of user's feeling that something is abnormal at the time of the switching from the analog broadcast to the digital broadcast varies depending on the radio wave state of the analog broadcast.

Although the degree of user's feeling that something is abnormal can be reduced by setting the mixing time provided by the cross fader 10 to a longer one, an echo can be heard during the mixing when the adjustment of a delay time between the analog broadcast and the digital broadcast at the broadcast station is not properly made and, as a result, a time lag occurs between them at the time of the mixing. Because this also makes the user feel discomfort, it is necessary to reduce the degree of user's feeling that something is abnormal with the mixing time provided by the cross fader 10 being shortened. Hereafter, the details of the switching process in consideration of this necessity will be explained.

Figure 4:
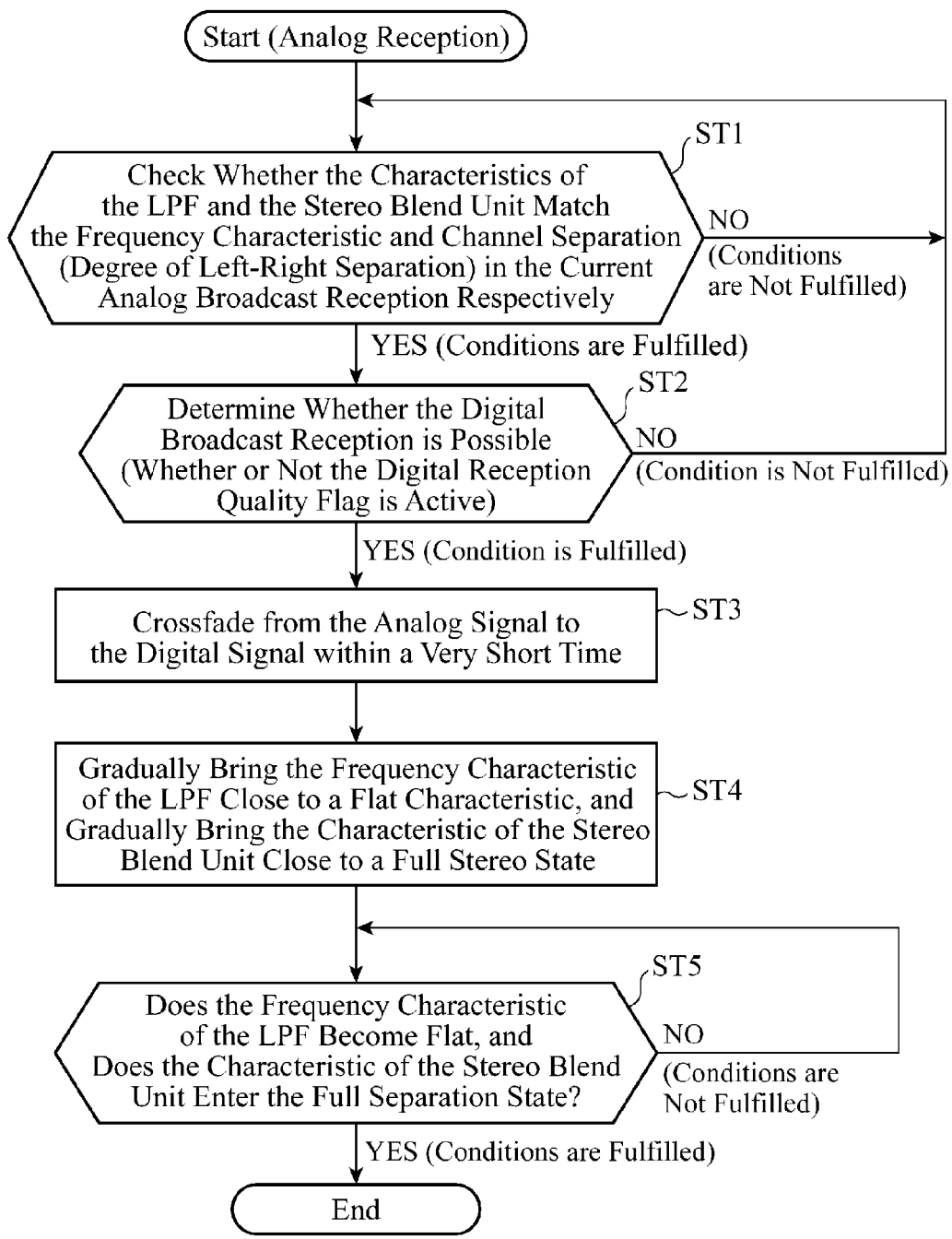
FIG. 4 is a flow chart showing a flow of switching from an analog broadcast to a digital broadcast which is carried out by the broadcast receiver in accordance with Embodiment 1.

FIG. 4 is a flow chart showing a flow of switching from an analog broadcast to a digital broadcast which is carried out by the broadcast receiver in accordance with Embodiment 1, and the details of the process will be explained with reference to this flow chart.

First, the reception quality determining unit 14 of the CPU 13 checks whether the characteristics of the LPF 8 and the stereo blend unit 9 match the frequency characteristic and channel separation (the degree of left-right separation) in the current analog broadcast reception respectively on the basis of the signal strength information in the current analog broadcast reception from the radio wave state detector 6 (step ST1).

More specifically, the reception quality determining unit determines a signal quality factor by adding an amount of multipath or the like to each signal strength value, and makes it a rule to uniquely determine the cut-off frequency of the LPF 8 and the characteristic of the stereo blend unit 9 from the value of the factor. In accordance with this Embodiment 1, the comparison table 15 is constructed from data as shown in FIG. 3 without taking any parameters other than the signal strength into consideration, and the reception quality determining unit 14 selects a setting suitable for the LPF 8 and the stereo blend unit 9 from the signal strength information acquired from the radio wave state detector 6.

When, in step ST1, determining the characteristics of the LPF 8 and the stereo blend unit 9 do not match the frequency characteristic and channel separation (the degree of left-right separation) in the current analog broadcast reception respectively (if NO; if the conditions are not fulfilled), the CPU 13 controls the LPF 8 and the stereo blend unit 9 to change their characteristics in such a way that their characteristics match the current analog broadcast reception characteristics.

Next, the digital reception quality flag determining unit 18 of the CPU 13 determines whether or not the digital reception quality flag acquired from the decoder 7 is active (step ST2). At this time, when the digital reception quality flag is active and the digital broadcast reception is possible, the digital reception quality flag determining unit 18 commands the cross fader control unit 19 to switch the broadcast to be outputted from the analog broadcast to the digital broadcast.

The cross fader 10 switches from the analog broadcast to the digital broadcast within a very short time according to the control by the cross fader control unit 19 (step ST3). In contrast, when the digital reception quality flag is inactive and the digital broadcast reception is impossible (if NO; if the condition is not fulfilled), the digital reception quality flag determining unit returns to the process of step ST1.

Figure 5:
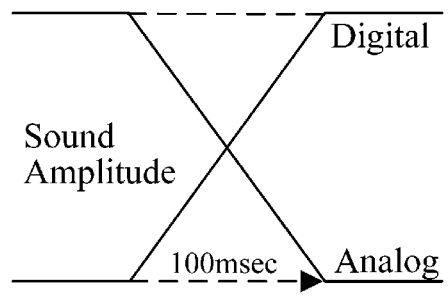
FIG. 5 is a view showing a brief description of a process of switching from the analog broadcast to the digital broadcast which is carried out by the broadcast receiver in accordance with Embodiment 1.
Figure 5:
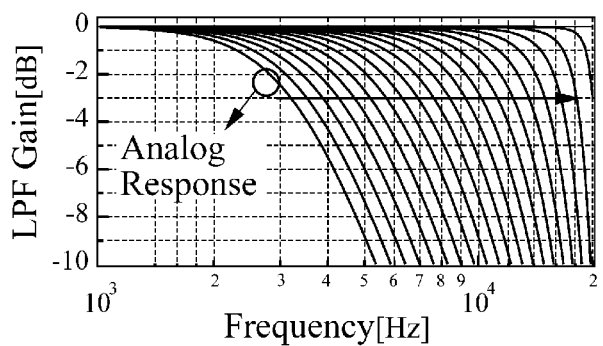
Figure 5:
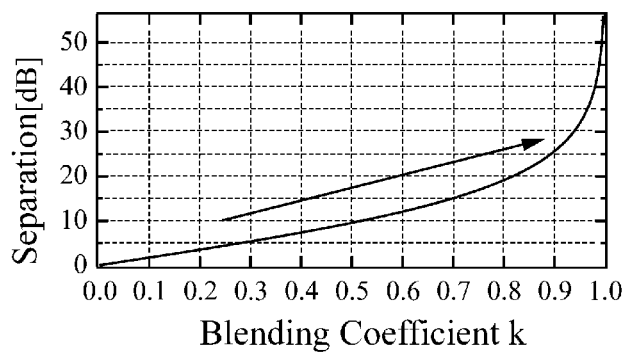

FIG. 5 is a view showing a brief description of the switching process of switching from the analog broadcast to the digital broadcast which is carried out by the broadcast receiver in accordance with Embodiment 1, FIG. 5(*a*) shows a crossfade at the time of switching from the analog broadcast to the digital broadcast, FIG. 5(*b*) shows an example of a change in the frequency characteristic, and FIG. 5(*c*) shows an example of a change in the channel separation (the degree of left-right separation). For example, the cross fader 10, in step ST3, carries out a crossfade from the analog broadcast signal to the digital broadcast signal during a time period of about 100 milliseconds (msec), as shown in FIG. 5(*a*).

Furthermore, a filter having a first or second order transfer function is used as the LPF 8. When the cut-off frequency of the LPF 8 having the smallest cut-off frequency at the moment of switching to the digital broadcast reception is expressed as fc_min and the cut-off frequency of the LPF 8 having the largest cut-off frequency is expressed as fc_max (½fs; ½ of the sampling frequency), the cut-off frequency fc(n) which is the n-th lowest cut-off frequency among the cut-off frequencies obtained by dividing the difference between fc_max and fc_min into N (n<=N) equal parts is given by the following equation (1):

$$fc(n)=10^{((log(fc\_min)+n*(log(fc\_max)-log(fc\_min))/N))} \quad (1)$$

The graph shown in FIG. 5(*b*), in which the horizontal axis shows the logarithm of the frequency and the vertical axis shows the gain (the output signal amplitude) of the LPF 8, shows the frequency characteristic of the LPF 8 which is determined according to the above-mentioned equation (1). Furthermore, in FIG. 5(*b*), curved lines showing the frequency characteristic and respectively corresponding to the frequencies ranging from the lowest cut-off frequency fc_min to the highest cut-off frequency fc_max are aligned along the horizontal axis at equal intervals (N equal intervals). A flat setting is a final setting in the next step after the cut-off frequency fc_max is set up.

Figure 6:
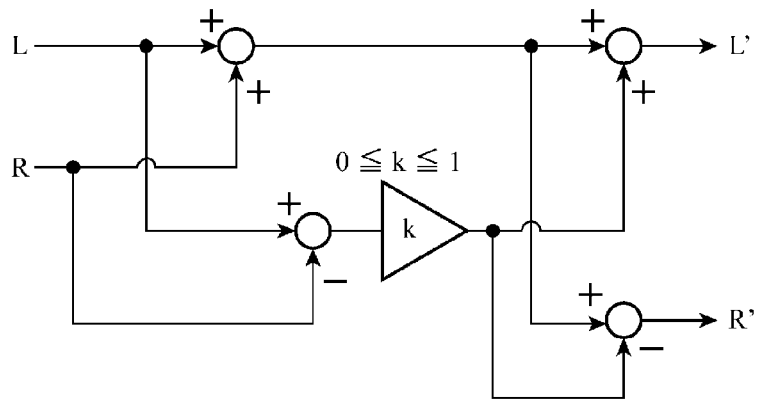
FIG. 6 is a view showing the structure of a stereo blend unit shown in FIG. 1.

Furthermore, a unit having such a structure as shown in FIG. 6 is used as the stereo blend unit 9, for example. In this case, when a minimum separation value (a channel separation (the degree of left-right separation) at the moment of switching to the digital broadcast) is expressed as Sep_min (dB), the initial value k(0) of the blending coefficient k is expressed by the following equation:

$$k(0)=(1-10^{(Sep\_min/20)})/1+10^{(Sep\_min/20)})$$

When the value of the blending coefficient k is varied from k (0) to 1 (full separation), the blending coefficient k(m) which is the m-th smallest blending coefficient among the blending coefficients obtained by dividing the difference between 1 and k(0) into N (m<=N) equal parts is given by the following equation (2):

$$k(m)=k(0)+m*(1-k(0))/N \quad (2)$$

By increasing the value of the blending coefficient k gradually according to the above-mentioned equation (2), the separation is increased. Finally, k=1 is obtained (the separation is in a state in which there is no restriction). This increase of the separation is shown in FIG. 5(*c*).

Returning the explanation with reference to FIG. 4, when the cross fader 10, in step ST3, carries out a crossfade from the analog signal to the digital signal, the LPF control unit 16 of the CPU 13 gradually brings the frequency characteristic of the LPF 8 close to a flat characteristic (gradual increase), as shown by an arrow in FIG. 5(*b*). Furthermore, the blend unit control unit 17 of the CPU 13 gradually brings the characteristic of the stereo blend unit 9 close to a full stereo state (the state of the blending coefficient k=1) (gradual increase) (step ST4), as shown by an arrow in FIG. 5(*c*). Thus, the characteristics of the LPF 8 and the stereo blend unit 9 are increased gradually up to the above-mentioned receiving characteristics set for the digital broadcast (i.e., the frequency characteristic of the LPF 8 is flat and the characteristic of the stereo blend unit 9 is in the full separation state) according to the control by the CPU 13.

The connection relation between the LPF 8 and the stereo blend unit 9 can be reversed, and the process of bringing the characteristic of the stereo blend unit 9 close to the full stereo state can be carried out before the process of bringing the frequency characteristic of the LPF 8 close to the flat characteristic is carried out. As an alternative, the LPF control unit 16 and the blend unit control unit 17 can carry out these processes concurrently.

The LPF control unit 16 and the blend unit control unit 17 carry out the control operations of controlling the LPF 8 and the stereo blend unit 9 respectively in such a way that the frequency characteristic of the LPF 8 becomes flat and the characteristic of the stereo blend unit 9 enters the full separation (full stereo) state (step ST5). When the receiving characteristics of the digital broadcast become what they should be (the original characteristics), that is, when the frequency characteristic of the LPF 8 becomes flat and the characteristic of the stereo blend unit 9 enters the full separation state (if YES; if the conditions are fulfilled), the CPU 13 ends its processing.

(2-2) Switching from the Digital Broadcast to the Analog Broadcast

Figure 7:
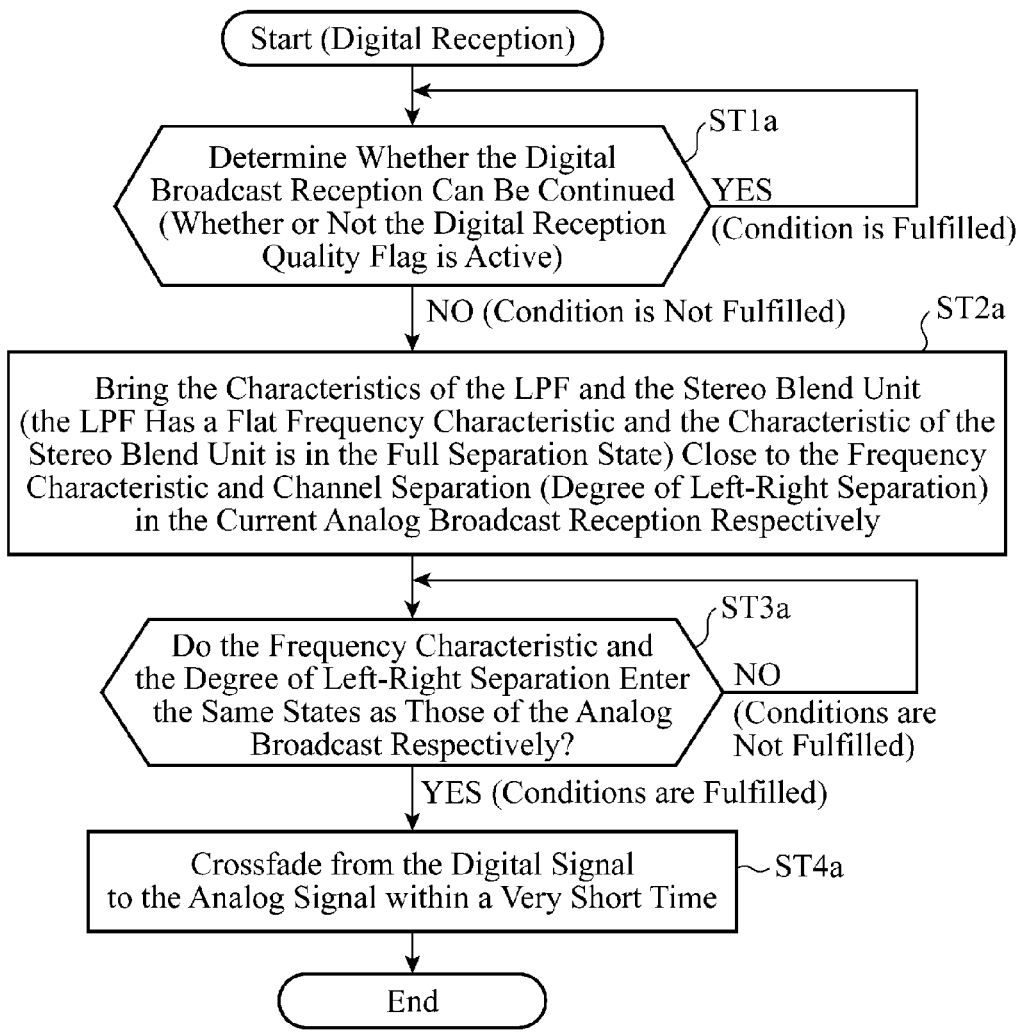
FIG. 7 is a flow chart showing a flow of switching from the digital broadcast to the analog broadcast which is carried out by the broadcast receiver in accordance with Embodiment 1.

FIG. 7 is a flow chart showing a flow of switching from the digital broadcast to the analog broadcast which is carried out by the broadcast receiver in accordance with Embodiment 1.

First, the digital reception quality flag determining unit 18 determines whether or not the digital reception quality flag acquired from the decoder 7 is active (step ST1*a*). At this time, when the digital broadcast reception is possible (if YES; if the condition is fulfilled), the digital reception quality flag determining unit continues the digital broadcast reception and repeats the process of step ST1*a*. In contrast, when the digital reception quality flag is inactive and the reception of the digital broadcast becomes impossible (if NO; if the condition is not fulfilled), the digital reception quality flag determining unit 18 notifies the reception quality determining unit 14 that the digital reception quality flag is inactive and the reception of the digital broadcast is impossible.

When receiving the above-mentioned notification, the reception quality determining unit 14 specifies the current frequency characteristic and channel separation (the degree of left-right separation) of the analog broadcast according to the signal strength information in the analog broadcast reception from the radio wave state detector 6, and commands the LPF control unit 16 and the blend unit control unit 17 to gradually decrease the bandwidth of the LPF 8 and the channel separation (the degree of left-right separation) of the stereo blend unit 9 (the frequency characteristic of the LPF 8 is flat and the characteristic of the stereo blend unit 9 is in the full separation (full stereo) state) to the current frequency characteristic and channel separation the degree of left-right separation) of the analog broadcast respectively.

Figure 8:
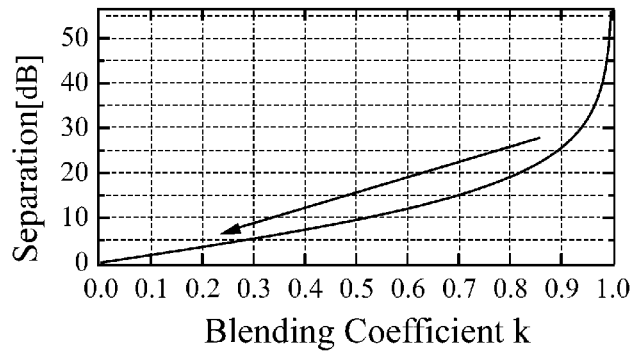
FIG. 8 is a view showing a brief description of a process of switching from the digital broadcast to the analog broadcast which is carried out by the broadcast receiver in accordance with Embodiment 1.
Figure 8:
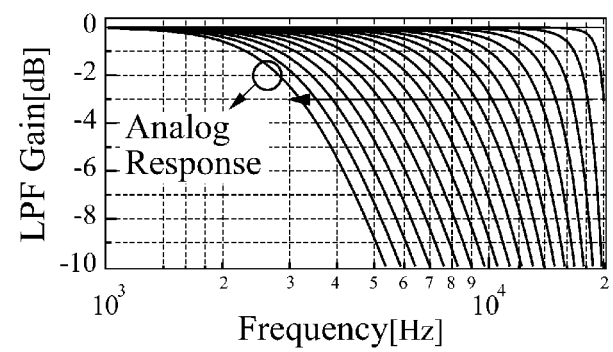
Figure 8:
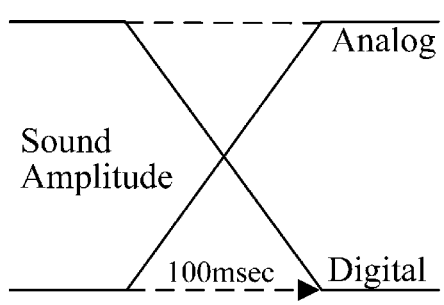

FIG. 8 is a view showing a brief description of the switching process of switching from the digital broadcast to the analog broadcast which is carried out by the broadcast receiver in accordance with Embodiment 1, FIG. 8(*a*) shows an example of a change in the channel separation (the degree of left-right separation), FIG. 8(*b*) shows an example of a change in the frequency characteristic, and FIG. 8(*c*) shows an example of a crossfade at the time of switching from the digital broadcast to the analog broadcast. When, in step ST2*a*, receiving the command from the reception quality determining unit 14, the blend unit control unit 17 gradually brings the characteristic of the stereo blend unit 9 close to the same state as the current analog broadcast reception, as shown by an arrow in FIG. 8(*a*). Furthermore, the LPF control unit 16 gradually brings the frequency characteristic of the LPF8 close to the same state as the current analog broadcast reception from the flat characteristic, as shown by an arrow in FIG. 8(*b*). Thus, the LPF 8 and the stereo blend unit 9 gradually decrease the receiving characteristics of the digital broadcast from the original receiving characteristics to the analog receiving characteristics under the control of the CPU 13.

The LPF control unit 16 and the blend unit control unit 17 control the LPF 8 and the stereo blend unit 9 respectively, and carry out the control operations in such a way that the frequency characteristic of the LPF 8 and the characteristic of the stereo blend unit 9 enter the same states as those in the current analog broadcast reception respectively (step ST3a). In this case, when receiving a notification showing that the frequency characteristic of the LPF 8 and the characteristic of the stereo blend unit 9 enter the same states as those in the current analog broadcast reception respectively (if YES; if the conditions are fulfilled) from the LPF control unit 16 and the blend unit control unit 17, the digital reception quality flag determining unit 18 commands the cross fader control unit 19 to switch from the digital broadcast to the analog broadcast.

According to the command from the cross fader control unit 19, the cross fader 10 switches from the digital broadcast signal to the analog broadcast signal within a very short time (step ST4a). For example, the cross fader 10 carries out a crossfade from the digital broadcast signal to the analog broadcast signal during a time period of about 100 milliseconds (msec), as shown in FIG. 8(c).

The process of bringing the frequency characteristic of the LPF 8 close to the same state as that in the current analog broadcast reception can be carried out before the process of bringing the characteristic of the stereo blend unit 9 close to the same state as that in the current analog broadcast reception is carried out. As an alternative, the LPF control unit 16 and the blend unit control unit 17 can carry out these processes concurrently.

As mentioned above, when switching from a digital broadcast to an analog broadcast, the broadcast receiver in accordance with this Embodiment 1 switches to the analog broadcast after adjusting the reproduced frequency band and the degree of left-right separation between the left and right channels of the digital broadcast to be equal to the values of the analog broadcast which are specified from the receiving state of the analog broadcast respectively, and, when switching from the analog broadcast to the digital broadcast, after adjusting the reproduced frequency band and the degree of left-right separation between the left and right channels of the digital broadcast to be equal to the values of the analog broadcast which are specified from the receiving state of the analog broadcast respectively and then switching to the digital broadcast, adjusts the reproduced frequency band and the degree of left-right separation between the left and right channels of the digital broadcast to be equal to the values set for the digital broadcast respectively. Thus, by adjusting the acoustic characteristics of the digital broadcast according to the receiving state of the analog broadcast, the broadcast receiver can carry out switching the sound to be outputted between the analog broadcast and the digital broadcast smoothly without causing hearing discomfort to the user.

In above-mentioned Embodiment 1, a North American HD radio is explained as an example, though the present invention is not limited to this example. The present invention can be applied to any broadcast medium, such as a broadcast medium, in Europe, which switches between DAB (Digital Audio Broadcasting) and FM broadcasting being simultaneously broadcasted, as long as the broadcast medium simultaneously broadcasts an analog broadcast and a digital broadcast.

INDUSTRIAL APPLICABILITY

Because the broadcast receiver in accordance with the present invention can carry out switching between an analog broadcast and a digital broadcast smoothly without causing hearing discomfort to a user, the broadcast receiver in accordance with the present invention is suitable for use as a broadcast receiver that receives an analog broadcast and a digital broadcast which have the same broadcast contents and which are being broadcasted concurrently from a broadcast medium, or the like.

The invention claimed is:

1. A broadcast receiver that receives an analog broadcast and a digital broadcast which have same broadcast contents and which are being broadcasted concurrently from a broadcast medium, said broadcast receiver comprising:
a controller programmed to execute a process of switching between said analog and digital broadcasts for outputting, and controlling frequency and left-right separation settings regarding said digital broadcast;
a switch controlled by said controller to switch a sound to be outputted between a sound extracted from said analog broadcast and a sound extracted from said digital broadcast;
a detecting device that detects a receiving state of said analog broadcast;
an analog broadcast sound signal processing device that restricts a frequency characteristic and a degree of left-right separation of left and right channel signals of the sound signal of said analog broadcast;
a first adjusting device controlled by said controller to adjust a reproduced frequency band exclusively used for said digital broadcast; and
a second adjusting device controlled by said controller to adjust a degree of left-right separation exclusively used for said digital broadcast,
wherein said controller is programmed to:
determine a restricted setting of the reproduced frequency band and a restricted setting of the degree of left-right separation of the sound signal extracted from said analog broadcast, said restricted settings having been set by said analog broadcast sound signal processing device, from the receiving state detected by said detecting device,
control said switching to, when switching from said digital broadcast to said analog broadcast, switch from outputting the sound signal extracted from said digital broadcast exclusively to outputting the sound signal extracted from said analog broadcast exclusively after controlling restricting characteristics of said first and second adjusting devices in such a way that the reproduced frequency band and the degree of left-right separation of the sound signal extracted from said digital broadcast vary from the unrestricted settings exclusively used for said digital broadcast and become equal to said determined restricted settings, and
while the sound signal of the analog broadcast is outputted exclusively with the reproduced frequency band and the degree of left-right separation of said digital broadcast equal to said determined settings, make a decision to switch from said analog broadcast to said digital broadcast, and then control said switch to switch from outputting the sound signal extracted from said analog broadcast exclusively to outputting the sound signal extracted from said digital broadcast, and thereafter control said first and second adjusting devices to increase the reproduced frequency band and the degree of left-right separation of said digital broadcast up to the unrestricted settings exclusively used for said digital broadcast respectively.

2. The broadcast receiver according to claim 1, wherein said broadcast receiver includes a flag setting device for setting a flag value showing quality of reception of the digital broadcast, and, when determining that reception of said digital broadcast is impossible from said flag value at a time of the reception of the digital broadcast, said controller switches to the sound signal extracted from said analog broadcast after restricting the characteristics of said first and second adjusting devices in such a way that the reproduced frequency band and the degree of left-right separation of the sound signal extracted from said digital broadcast vary from the unrestricted settings exclusively used for said digital broadcast and become equal to the settings at a time of reception of said analog broadcast, said settings being specified from the receiving state detected by said detecting device, respectively, whereas when determining that reception of said digital broadcast is possible from said flag value at a time of reception of the analog broadcast, said controller switches to the sound signal extracted from said digital broadcast after restricting said first and second adjusting devices in such a way that the reproduced frequency band and the degree of left-right separation of said digital broadcast become equal to said specified settings at the time of reception of said analog broadcast respectively.

* * * * *